(12) United States Patent
Wakizaka

(10) Patent No.: US 10,343,661 B2
(45) Date of Patent: Jul. 9, 2019

(54) VEHICLE BRAKE HYDRAULIC PRESSURE CONTROL DEVICE

(71) Applicant: AUTOLIV NISSIN BRAKE SYSTEMS JAPAN CO., LTD., Ueda, Nagano (JP)

(72) Inventor: Keisuke Wakizaka, Nagano (JP)

(73) Assignee: AUTOLIV NISSIN BRAKE SYSTEMS JAPAN CO., LTD., Nagano (JP)

(*) Notice: Subject to any disclaimer, the term of this patent is extended or adjusted under 35 U.S.C. 154(b) by 0 days.

(21) Appl. No.: 15/471,445

(22) Filed: Mar. 28, 2017

(65) Prior Publication Data

US 2017/0282871 A1  Oct. 5, 2017

(30) Foreign Application Priority Data

Mar. 30, 2016 (JP) .................. 2016-067268

(51) Int. Cl.
*B60T 8/17* (2006.01)
*B60T 8/1764* (2006.01)
(Continued)

(52) U.S. Cl.
CPC .......... *B60T 8/1764* (2013.01); *B60T 8/1755* (2013.01); *B60T 8/17551* (2013.01);
(Continued)

(58) Field of Classification Search
CPC .................................................. B60T 8/1764
See application file for complete search history.

(56) References Cited

U.S. PATENT DOCUMENTS 5,286,098 A * 2/1994 Okubo .................. B60T 8/1755
                                                    303/148
5,520,448 A * 5/1996 Okubo ................ B60T 8/17636
                                                    303/148
(Continued)

FOREIGN PATENT DOCUMENTS

DE          10207378       5/2003
JP          2013193479     9/2013
(Continued)

OTHER PUBLICATIONS

European Search Report for EP Application No. 17163545.1-1762 dated Aug. 7, 2017, 7 pages.

*Primary Examiner* — Adam D Tissot
*Assistant Examiner* — Alex C Dunn
(74) *Attorney, Agent, or Firm* — Andrew M. Calderon; Roberts Mlotkowski Safran Cole & Calderon, P.C.

(57) ABSTRACT

The hydraulic pressure controlling unit is capable of execute a first control, a second control, and a third control. The third control is configured to be started under condition that during the second control, an anti-lock brake control on the wheel brake on the high-μ road side is started, the acceptable differential pressure is equal to or larger than a first threshold, or a steering angle of a steering is equal to or larger than a second threshold. During the third control, the hydraulic pressure controlling unit is configured to decrease the hydraulic pressure of the wheel brake on the high-μ road side if the vehicle state deciding unit decides that the vehicle is in an unstable state.

6 Claims, 11 Drawing Sheets

(51) Int. Cl.
*B60T 8/1755* (2006.01)
*B60T 13/68* (2006.01)

(52) U.S. Cl.
CPC ....... *B60T 13/686* (2013.01); *B60T 2210/124* (2013.01); *B60T 2250/03* (2013.01)

(56) References Cited

U.S. PATENT DOCUMENTS

| | | | | |
|---|---|---|---|---|
| 6,941,213 | B2 * | 9/2005 | Yasui | B60T 8/172 |
| | | | | 701/41 |
| 8,224,546 | B2 * | 7/2012 | Terasaka | B60T 8/1764 |
| | | | | 701/71 |
| 9,248,814 | B2 * | 2/2016 | Hirose | B60T 8/1764 |
| 2003/0111899 | A1 * | 6/2003 | Heinemann | B60T 8/1755 |
| | | | | 303/148 |
| 2004/0138803 | A1 | 7/2004 | Mahlo et al. | |
| 2006/0100766 | A1 | 5/2006 | Schwarz et al. | |
| 2009/0248250 | A1 * | 10/2009 | Yasui | B62D 6/003 |
| | | | | 701/42 |
| 2012/0271516 | A1 * | 10/2012 | Takahashi | B62D 5/0466 |
| | | | | 701/42 |
| 2013/0184955 | A1 * | 7/2013 | Kobayashi | B60T 8/1764 |
| | | | | 701/72 |
| 2013/0245909 | A1 * | 9/2013 | Hirose | B60T 8/1764 |
| | | | | 701/73 |

FOREIGN PATENT DOCUMENTS

| | | |
|---|---|---|
| WO | 02083471 | 10/2002 |
| WO | 2004005093 | 1/2004 |

* cited by examiner

VEHICLE BRAKE HYDRAULIC PRESSURE CONTROL DEVICE

CROSS-REFERENCE TO RELATED APPLICATION

The present application claims priority under 35 U.S.C. § 119 to Japanese Patent Application No. 2016-067268, filed Mar. 30, 2016. The contents of this application are incorporated herein by reference in their entirety.

FIELD

The present disclosure relates to a brake hydraulic pressure control device for a vehicle.

In general, as such vehicle brake hydraulic pressure control devices, a device is known, which appropriately controls a brake hydraulic pressure on a so-called split road, in which friction coefficients (hereinafter, also referred to as "$\mu$") of left and right sides of a road surface in contact with wheels are greatly different from each other (see Japanese Patent Application Publication No. 2013-193479). Specifically, in this technology, an acceptable differential pressure between brake hydraulic pressures of right and left wheel brakes is calculated such that an actual yaw rate detected by a yaw rate sensor becomes close to a target yaw rate set based on a steering angle and a vehicle speed, and then a brake hydraulic pressure on a high-$\mu$ road side is limited such that a differential pressure between brake hydraulic pressures of right and left wheel brakes does not exceed the acceptable differential pressure. Also, the brake hydraulic pressure on the high-$\mu$ road side is decreased if conditions for an anti-lock brake control (hereinafter, also referred to as an "ABS control") on the high-$\mu$ road side are fulfilled.

However, while the brake hydraulic pressure of the high-$\mu$ road side is limited by using the acceptable differential pressure, it is required to perform a more suitable brake hydraulic pressure control and thus to further enhance a vehicle attitude control, if the vehicle is in an unstable state, such as where the vehicle is greatly swayed to the high-$\mu$ road side and the like.

SUMMARY

Accordingly, an object of the present disclosure is to further enhance a vehicle attitude control In order to solve the above object, a vehicle brake hydraulic pressure control device according the present disclosure includes a split road deciding unit configured to decide whether or not a road in contact of wheels of a vehicle is a split road; a hydraulic pressure controlling unit capable of executing a limiting processing for limiting a hydraulic pressure of a wheel brake on a high-$\mu$ road side so that a differential pressure between a hydraulic pressure of a wheel brake on a low-$\mu$ road side and the hydraulic pressure of the wheel brake on the high-$\mu$ road side becomes equal to or smaller than an acceptable differential pressure, under condition that the split road deciding unit decides that the road is the split road; and a vehicle state deciding unit configured to decide whether or not the vehicle is in an unstable state.

The hydraulic pressure controlling unit is capable of executing a first control for determining the acceptable differential pressure in accordance with a first method during a predetermined time period after the split road deciding unit decides that the road is the split road; a second control for determining the acceptable differential pressure in accordance with a second method after the predetermined time period passes; and a third control configured to be started under condition that during the second control, an anti-lock brake control on the wheel brake on the high-$\mu$ road side is started, die acceptable differential pressure is equal to or larger than a first threshold, or a steering angle of a steering is equal to or larger than a second threshold. Also, during the third control, the hydraulic pressure controlling unit is configured to decrease the hydraulic pressure of the wheel brake on the high-$\mu$ road side if the vehicle state deciding unit decides that the vehicle is in an unstable state.

According to this configuration, if during the third control, the vehicle is in an unstable state, the hydraulic pressure of the wheel brake on the high-$\mu$ road side is decreased. Accordingly, it is possible to further enhance the vehicle attitude control.

Also, in the above configuration, the vehicle brake hydraulic pressure control device may include a yaw rate detecting unit configured to detect an actual yaw rate. The vehicle state deciding unit may be configured to decide whether or not the vehicle has been swayed to the high-$\mu$ road side by comparison between the actual yaw rate detected by the yaw rate detection unit and a target yaw rate and then to decide that the vehicle is in an unstable state if it is decided that the vehicle has been swayed to the high-$\mu$ road side.

Therefore, in the case where the vehicle has been swayed to the high-$\mu$ road side, the hydraulic pressure on the high-$\mu$ road side can be decreased, thereby allowing braking to be more stably performed.

Further, in the above configuration, the hydraulic pressure controlling unit may be configured to set an upper limit of the hydraulic pressure of the wheel brake on the high-$\mu$ road side so that the upper limit has a value larger than a value obtained by adding the acceptable differential pressure to the hydraulic pressure of the wheel brake on the low-$\mu$ road side, if during the third control, the vehicle state deciding unit decides that the vehicle is not in an unstable state, and also to determine the upper limit based on a deviation between the actual yaw rate and the target yaw rate, if during the third control, the vehicle state deciding unit decides that the vehicle is in an unstable state.

Therefore, by using the deviation between the actual yaw rate and the target yaw rate, it is possible to set the upper limit in accordance with an extent of swaying of the vehicle. Accordingly, the hydraulic pressure on the high-$\mu$ road side can be appropriately decreased.

Further, in the above configuration, the hydraulic pressure controlling unit may be configured to gradually increase the upper limit by adding a predetermined value to a last value of the upper limit, if during the third control, the vehicle state deciding unit decides that the vehicle is not in an unstable state.

Therefore, since the upper limit can be gradually increased, it is possible to suppress a sudden fluctuation of the hydraulic pressure on the high-$\mu$ road side, thereby allowing braking to be more stably performed According to the present disclosure, a vehicle attitude control can be further enhanced.

DETAILED DESCRIPTION OF EMBODIMENTS

Hereinafter, exemplary embodiments of the present disclosure will be described in detail, appropriately referring to the accompanying drawings.

Figure 1:
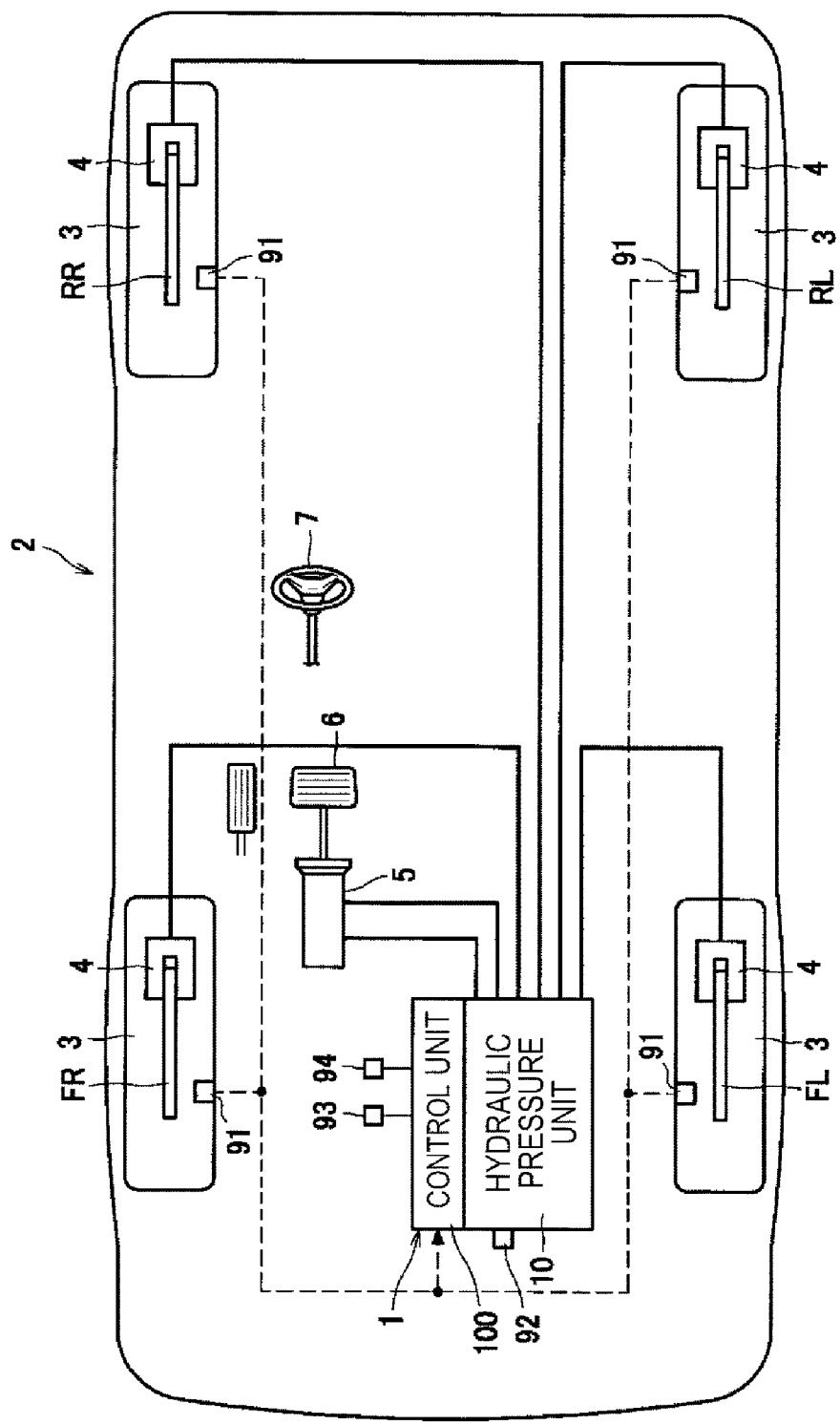
FIG. 1 is a configuration view of a vehicle having a vehicle brake hydraulic pressure control device according to an embodiment.

As shown in FIG. 1, a vehicle bake hydraulic pressure control device 1 is a device intended to properly control a braking force to be imparted to each of wheels 3 of a vehicle. The vehicle brake hydraulic pressure control device 1 mainly includes a hydraulic pressure unit 10 provided with fluid paths or various components, and a control unit 100 for properly controlling various components in the hydraulic pressure unit 10.

Each of the wheels 3 is equipped with wheel brakes FL, RR, RL, FR, respectively, and each of wheel brakes FL, RR, RL, FR is equipped with a wheel cylinder 4 for generating a braking force by a hydraulic pressure supplied from a master cylinder 5 as a hydraulic pressure source. Each of the master cylinder 5 and the wheel cylinder 4 is connected to the hydraulic pressure unit 10. Also, a hydraulic pressure, which is generated by the master cylinder 5 in accordance with a tread force (braking operation of a driver) on a brake pedal 6, is controlled in the control unit 100 and the hydraulic unit 10 and then supplied to the wheel cylinders 4.

To the control unit 100, wheel speed sensors 91 for detecting a wheel speed of each wheel 3, a pressure sensor 92 for detecting a pressure of the master cylinder 5, a steering angle sensor 93 for detecting a steering angle θ of a steering 7, and a yaw rate sensor 94 as an example of a yaw rate detection unit for detecting an actual yaw rate, which is a yaw rate actually acted on the vehicle 2, are connected. In addition, the control unit 100 has, for example, CPU (Central Processing Unit), RAM (Random Access Memory), ROM (Read Only Memory) and input/output circuits, and is configured to execute control by executing various arithmetic processing based on inputs from the wheel speed sensors 91 and the like and also on programs or data stored in the ROM. Meanwhile, details of the control unit 100 will be described below.

Figure 2:
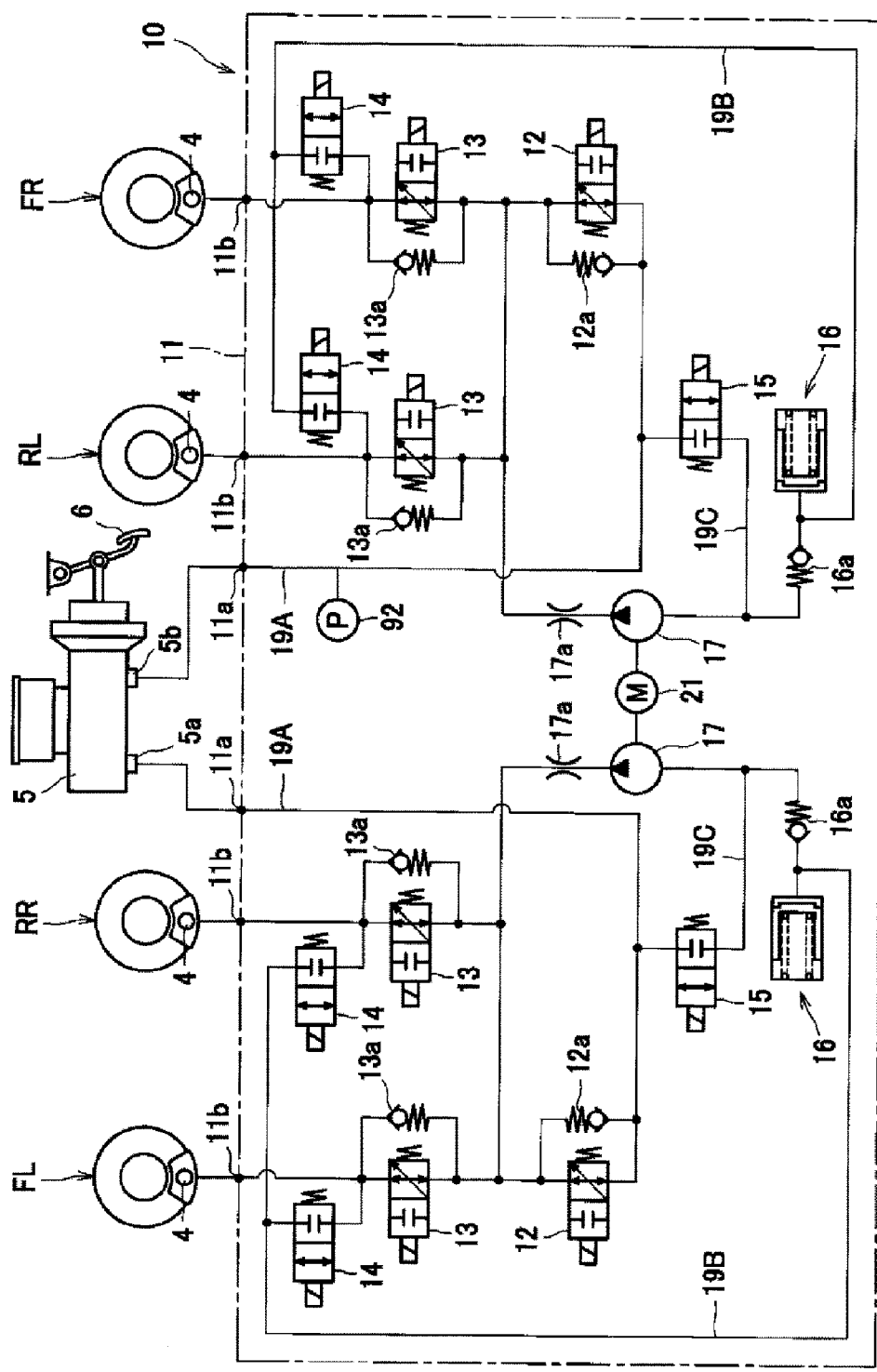
FIG. 2 is a configuration view showing a configuration of a hydraulic pressure unit.

As shown in FIG. 2, the hydraulic pressure unit 10 is arranged between the master cylinder 5, which is configured to generate a brake hydraulic pressure in accordance with a tread force exerted on the brake pedal 6 by a driver, and wheel brakes FR, FL, RR, RL.

The hydraulic pressure unit 10 is configured such that fluid paths and various solenoid valves are arranged in a pump body 11 as a base body having fluid paths (hydraulic pressure paths), through which a brake fluid flows. Output ports 5a, 5b of the master cylinder 5 are connected to input ports 11a of the pump body 11, and output ports 11b of the pump body 11 are connected to the respective wheel brakes FL, RR, RL, FR. In a normal state, a fluid path for communicating the input ports 11a with the output ports 11b is formed in the pump body 11, so that a tread force on the brake pedal 6 is transferred to each of the wheel brakes FL, RR, RL, FR. Meanwhile, a hydraulic pressure line connected to the output port 5a of the master cylinder 5 is connected to the wheel brakes FL, RR, and a hydraulic pressure line connected to the output port 5b of the master cylinder 5 is connected to the wheel brakes RL, FR. These lines have generally the same configuration.

In each hydraulic pressure line, a pressure regulation valve 12, which is a normal-open proportional solenoid valve capable of regulating a difference between hydraulic pressures on upstream and downstream sides in accordance with an electric current supplied thereto, is provided on a hydraulic pressure path connecting the input port 11a with the output ports 11b. In the pressure regulation valve 12, a check valve 12a configured to allow only a flow toward the output ports 11b is provided in parallel thereto.

Hydraulic pressure paths, which are located closer to the wheel brakes FL, RR, RL, FR than the pressure regulation valves 12, are divided midway to be connected to the respective output ports 11b. On each of hydraulic pressure paths corresponding to the respective output ports 11b, an inlet valve 13, which is a normal-open proportional solenoid valve, is arranged. In each inlet valve 13, a check valve 13a configured to allow only a flow toward the pressure regulation valve 12 is provided in parallel thereto.

A recirculation hydraulic pressure path 19B is provided to be connected from between each of the output ports 11b and the inlet valve 13 corresponding thereto to between the pressure regulation valve 12 and the inlet valve 13 via an output valve 14, which consists of a normal-close solenoid valve 14.

On the recirculation hydraulic pressure path 19B, a reservoir 16 for temporarily absorbing an excess brake fluid, a check valve 16a, a pump 17 and an orifice 17a are arranged in this order from the output valve 14 side. The check valve 16a is arranged to allow only a flow toward between the pressure regulation valve 12 and the inlet valve 13. The pump 17 is driven by a motor 21 and is provided to generate a pressure toward between the pressure regulation valve 12 and the inlet valve 13. The orifice 17a is configured to reduce pulsation of a pressure of a brake fluid discharged from the pump 17 and pulsation generated due to operation of the pressure regulation valve 12.

An introduction hydraulic pressure path 19A, which connects the input port 11a with the pressure regulation valve 12, and a portion of the recirculation hydraulic pressure path 19B, which is located between the check valve 16a and the pump 17 are connected to each other by an intake hydraulic pressure path 19C. On the intake hydraulic pressure path 19C, an intake valve 15, which is a normal-close solenoid valve, is arranged. In addition, the introduction hydraulic pressure path 19A is provided with the pressure sensor 92 for detecting a hydraulic pressure in the master cylinder 5.

According to the hydraulic pressure unit 10 configured as described above, in a normal state, electric current is not supplied to each of the solenoid valves, and thus a brake hydraulic pressure introduced from the input port 11a is outputted to the output ports 11b through the pressure regulation vale 12 and the inlet valve 13 and thus is intactly imparted to each wheel cylinder 4. Also, in the case of decreasing an excess brake hydraulic pressure of a wheel cylinder 4, such as when an anti-lock brake control is executed thereon, the corresponding inlet valve 13 is closed and the corresponding outlet valve 14 is opened, thereby allowing the brake fluid to flow to the reservoir 16 through the recirculation hydraulic pressure path 19B and thus extracting the brake fluid from the wheel cylinder 4. Further, in the case of applying a pressure to the wheel cylinder 4 when there is no operation of the brake pedal 6 by a driver, the intake valve 15 is opened and the motor 21 is driven, thereby allowing the brake fluid to be actively supplied to the wheel cylinder 4 by a pressure applied by the pump 17. Further, in the case of desiring to adjust the extent of a pressure applied to the wheel cylinder 4, this is done by adjusting an electric current to be flowed to the pressure regulation valve 12.

Next, details of the control unit 100 will be described.

Figure 3:
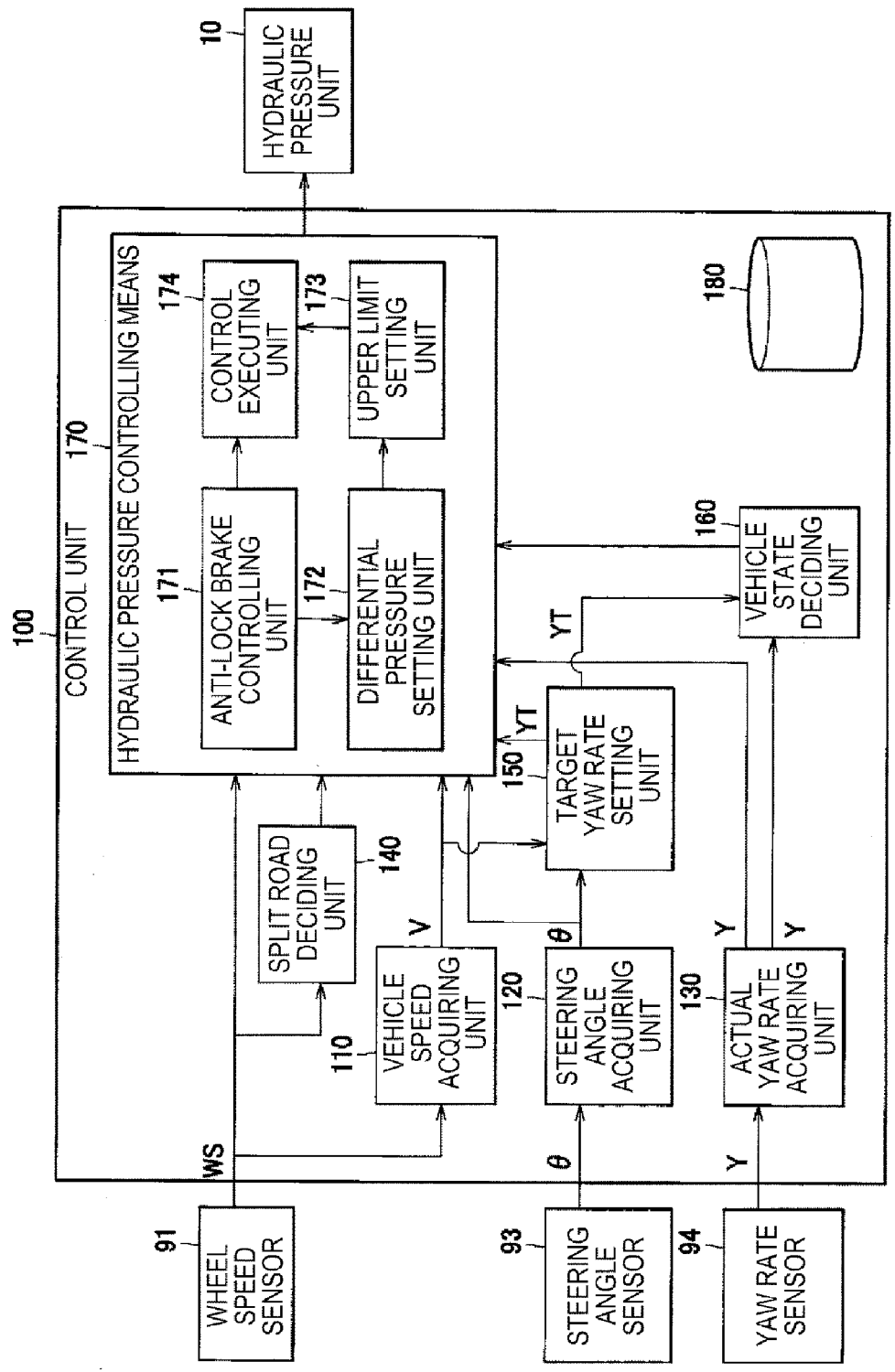
FIG. 3 is a block diagram showing a configuration of a control unit.

The control unit 100 is a device intended to execute control for stabilizing the vehicle by controlling the hydraulic pressure unit 10 and thus imparting a set brake hydraulic pressure to each of the wheel brakes FL, RR, RL, FR. For this purpose, as shown in FIG. 3, the control unit 100 mainly includes a vehicle speed acquiring unit 110, a steering angle acquiring unit 120, an actual yaw rate acquiring unit 130, a split road deciding unit 140, a target yaw rate setting unit 150, a vehicle state deciding unit 160, a hydraulic pressure controlling unit 170 and a memory unit 180.

The vehicle speed acquiring unit 110 is a unit configured to acquire information (pulse signals from the wheel speed sensors 91) on wheel speeds WS from the wheel speed sensors 91 and then calculating and acquiring a vehicle speed V by a known technique. The calculated vehicle speed V is outputted to the target yaw rate setting unit 150 and the hydraulic pressure controlling unit 170.

The steering angle acquiring unit 120 is a unit configured to acquire information on a steering angle θ from the steering angle sensor 93. The acquired steering angle θ is outputted to the target yaw rate setting unit 150 and the hydraulic pressure controlling unit 170. Herein, it should be noted that the steering angle θ is set such that a value when the steering 7 is operated in a direction, which causes the vehicle 2 to turn to a low μ road side in a split road, is positive.

The actual yaw rate acquiring unit 130 is a unit configured to acquire information on an actual yaw rate Y, which is a yaw rate actually acted on the vehicle 2, from the yaw rate sensor 94. The acquired actual yaw rate Y is outputted to the vehicle state deciding unit 160 and the hydraulic pressure controlling unit 170. Herein, it should be noted that the actual yaw rate Y and a target yaw rate YT as described below are set such that a value of a direction, which causes the vehicle 2 to turn to a high μ road side in a split road, is positive.

The split road deciding unit 140 is a unit configured to decide whether or not a road is a split road in which friction coefficients of left and right sides of a road surface in contact with the wheels 3 are different from each other by a predetermined value, when an anti-lock brake control is executed. A method of decision on the split road is not particularly limited, but as one example, a road can be decided as a split road, if among decelerations of wheels 3, a deceleration of a wheel 3 which exhibits the highest value (i.e., a value causing the lowest deceleration) is equal to or larger than a first threshold and also a difference between decelerations of right and left wheels 3 is equal to or larger than a second threshold. Also, if it is decided that a road is a split road, the split road deciding unit 140 also decides which side of right and left wheels 3 is a high-μ road side and which side of the right and left wheels 3 is a low-μ road side. As one example, of right and left wheels 3, one side on which a deceleration is smaller is decided as the high-μ road side, and the other side on which a deceleration is larger is decided as the low-μ road side. Information indicating that it is decided that a road is a split road is outputted to the hydraulic pressure controlling unit 170.

Figure 4:
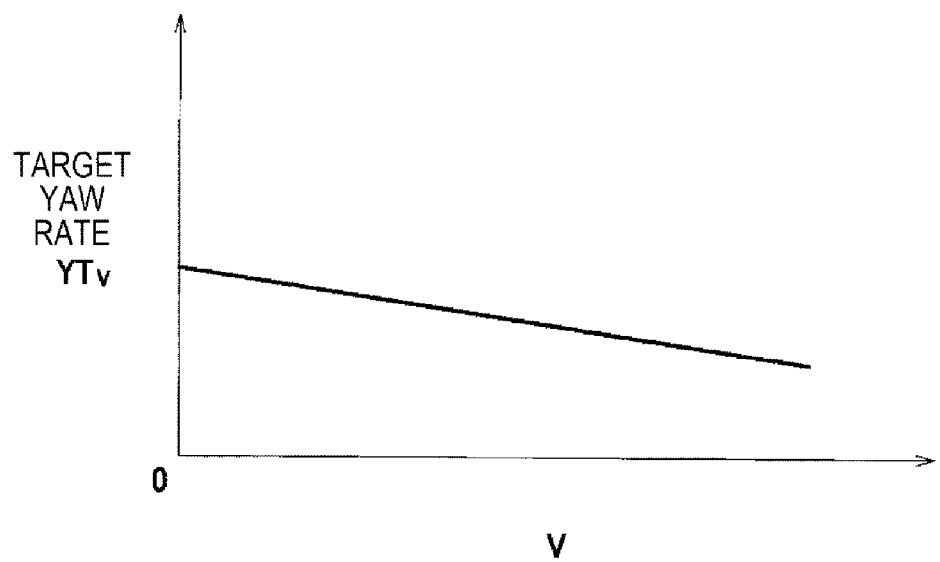
FIG. 4 is a map for setting a target yaw rate, showing a relationship between a vehicle speed and the target yaw rate based on the vehicle speed.
Figure 5:
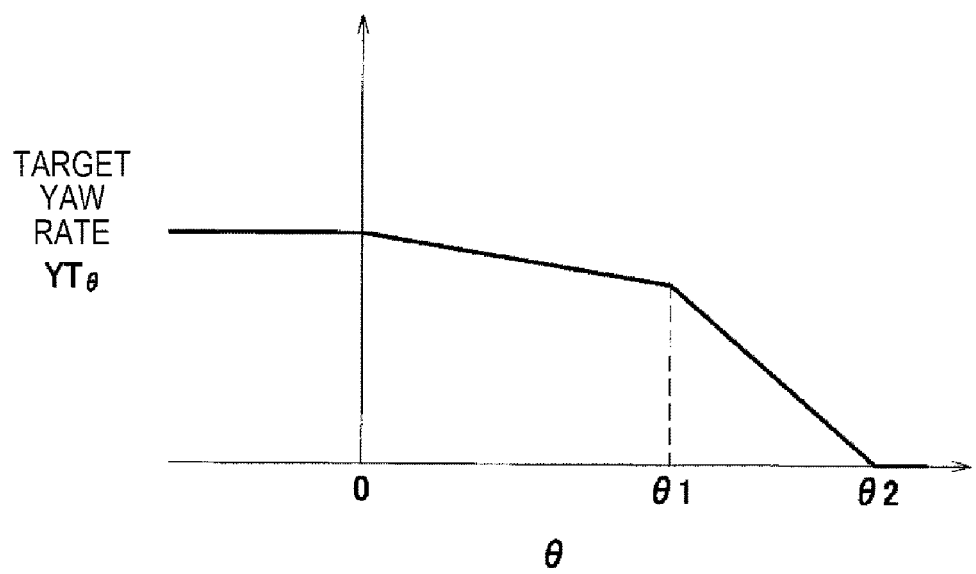
FIG. 5 is a map for setting a target yaw rate, showing a relationship between a steering angle and the target yaw rate based on the steering angle.

The target yaw rate setting unit 150 is a unit configured to set a target yaw rate YT based on the vehicle speed V and the steering angle θ. Specifically, a target yaw rate $YT_V$ based on the vehicle speed V and a target yaw rate $YT_\theta$ based on the steering angle θ are calculated and then a smaller one of the target yaw rates $YT_V$, $YT_\theta$ is calculated as the target yaw rate YT. FIG. 4 is a map for setting the target yaw rate $YT_V$ based on the vehicle speed V, in which as the vehicle speed V is increased, the target yaw rate $YT_V$ is decreased. Also, FIG. 5 is a map for setting the target yaw rate $YT_\theta$ based on the steering angle θ, in which as the steering angle θ is increased, the target yaw rate $YT_\theta$ is decreased. Specifically, if the steering angle θ is within a range of 0 or smaller, the target yaw rate $YT_\theta$ is set to a constant value, and if the steering angle θ is within a range from 0 to a predetermined value θ1, the target yaw rate $YT_\theta$ is decreased from the constant value at a predetermined reduction rate as the steering angle θ is increased. Further, if the steering angle θ is within a range from the predetermined value θ1 to a predetermined value θ2, the target yaw rate $YT_\theta$ is decreased at a reduction rate, which is larger than that in the range from 0 to the predetermined value θ1, as the steering angle θ is increased, and if the steering angle θ is larger than the predetermined value θ2, the target yaw rate $YT_\theta$ is set to 0. The set target yaw rate YT is outputted to the vehicle state deciding unit 160 and the hydraulic pressure controlling unit 170.

Meanwhile, the target yaw rate $YT_V$ when the vehicle speed V is 0 in the map of FIG. 4 is set to have a value smaller than the target yaw rate $YT_\theta$ when the steering angle θ is 0 in the map of FIG. 5.

The vehicle state deciding unit 160 is a unit configured to decide whether or not the vehicle 2 is in an unstable state. Specifically, the vehicle state deciding unit 160 is configured to compare the actual yaw rate Y with the target yaw rate YT and then to decide whether or not the vehicle 2 has been more swayed to a high-μ road side than a predetermined extent (in a turned state). If it is decided that the vehicle 2 is in the swayed state, it is decided that the vehicle 2 is in an unstable state. For example, if a deviation ΔY (=Y−YT) between the actual yaw rate Y and the target yaw rate YT is equal to or larger than a predetermined threshold, the vehicle state deciding unit 160 decides that the vehicle 2 is in an unstable state. Then, the vehicle state deciding unit 160 outputs the decided result to the hydraulic pressure controlling unit 170.

The hydraulic pressure controlling unit 170 includes an anti-lock brake controlling unit 171, a differential pressure setting unit 172, an upper limit setting unit 173 and a control executing unit 174.

The anti-lock brake controlling unit 171 is a unit configured to decide, for each wheel 3, whether or not an anti-lock brake control has to be executed and also decide, for each wheel 3, an instruction for hydraulic pressure control during the anti-lock brake control (which of a pressure-increasing state, a pressure-holding state and a pressure-decreasing state a hydraulic pressure in the respective wheel cylinders H has to be set to), by a known technique based on the wheel speed WS and the vehicle speed V. Information indicating starting the anti-lock brake control is outputted to the differential pressure setting unit 172 and the decided instruction for hydraulic pressure control is outputted to the control executing unit 174.

Figure 6:
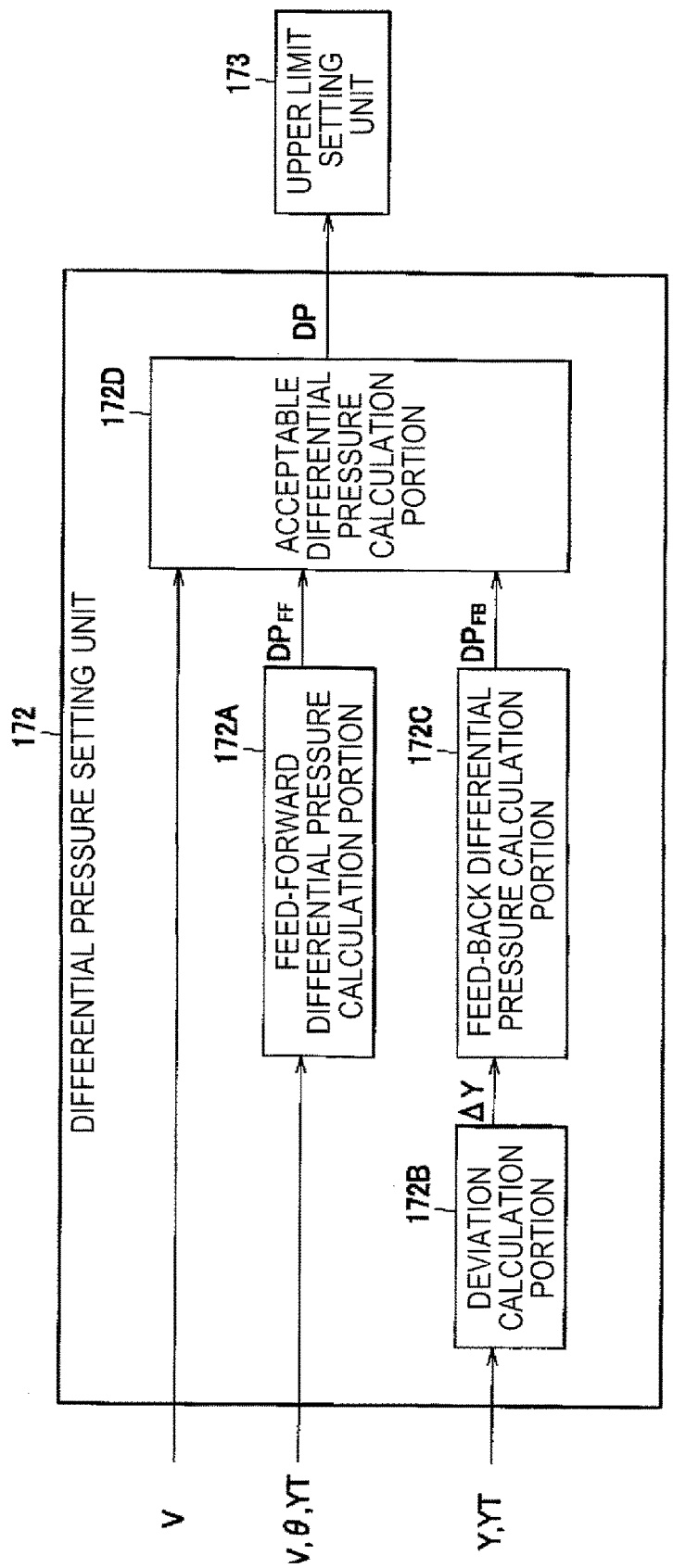
FIG. 6 is a block diagram showing a configuration of a differential pressure setting unit.

If the split road deciding unit 140 decides that a road is a split road, the differential pressure setting unit 172 sets an acceptable differential pressure DP, which is an acceptable value (upper limit) of difference between a brake hydraulic pressure of a wheel brake on the high-v road side and a brake hydraulic pressure of a wheel brake on the low-v road side, in such a manner that the actual yaw rate Y is caused to follow the target yaw rate YT. Herein, it should be noted that an actual yaw rate used for controlling of right wheels is set such that a clockwise direction when viewing the vehicle 2 from above is positive, and an actual yaw rate used for controlling of left wheels is set such that a counterclockwise direction when viewing the vehicle 2 from above is positive. The actual yaw rate Y compared with the target yaw rate YT becomes an actual yaw rate used for controlling of wheels on the high friction side. For the purpose of controlling as described above, as shown in FIG. 6, the differential pressure setting unit 172 mainly includes a feed-forward differential pressure calculation portion 172A, a deviation calculation portion 172B, a feed-back differential pressure calculation portion 172C, and an acceptable differential pressure calculation portion 172D.

Figure 7:
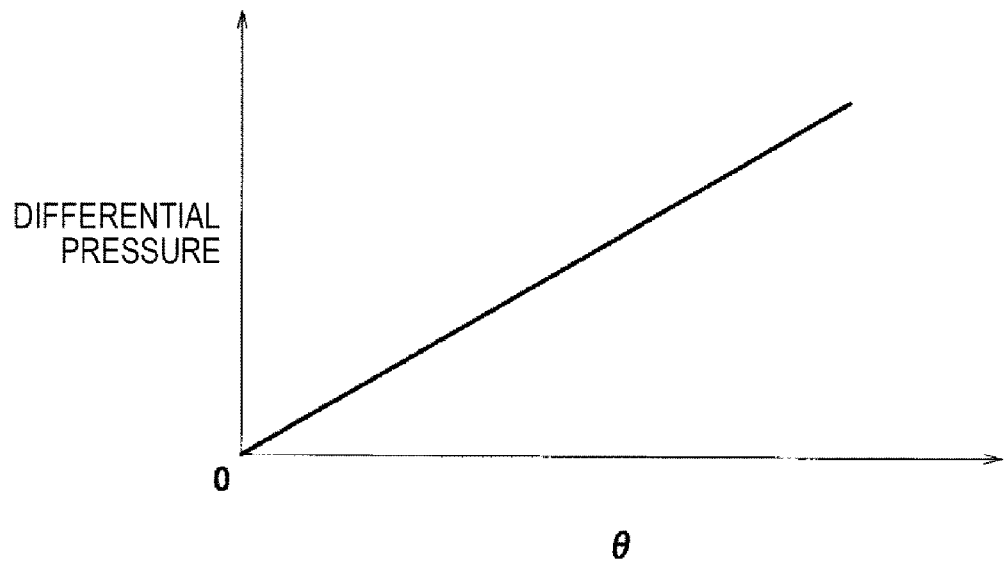
FIG. 7 is a map for setting a feed-forward differential pressure, showing a relationship between a steering angle and a differential pressure based on the steering angle.
Figure 8:
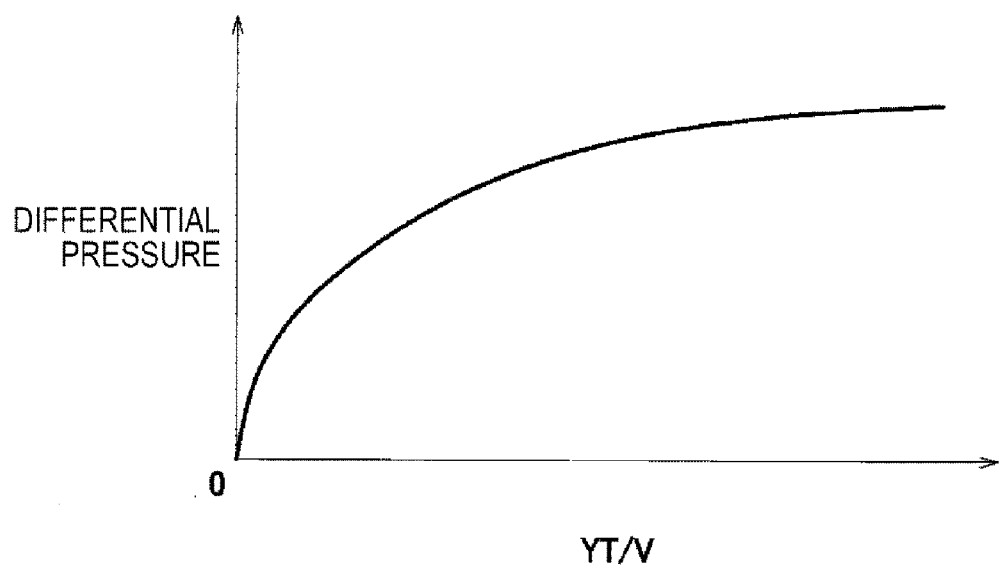
FIG. 8 is a map for setting a feed-forward differential pressure, showing a relationship between a ratio of a target yaw rate to a vehicle speed and a deferential pressure based on the ratio of the target yaw rate to the vehicle speed.

The feed-forward differential pressure calculation portion 172A is a unit configured to calculate a feed-forward differential pressure $DP_{FF}$ based on the steering angle θ, the vehicle speed V and the target yaw rate YT. Specifically, the feed-forward differential pressure $DP_{FF}$ is calculated by adding a differential pressure based on the vehicle speed V and the target yaw rate YT to a differential pressure based on the steering angle θ. FIG. 7 is a map for setting a differential pressure based on the steering angle θ, in which as the steering angle θ is increased, the differential pressure is increased. Also, FIG. 8 is a map for setting a differential pressure based on the vehicle speed V and the target yaw rate YT, in which as a ratio of the target yaw rate YT to the vehicle speed V (YT/V) is increased, the differential pressure is increased. The calculated feed-forward differential pressure $DP_{FF}$ is outputted to the acceptable differential pressure calculation portion 172D.

The deviation calculation portion 172B is a unit configured to calculate a deviation ΔY between the actual yaw rate Y and the target yaw rate YT. The calculated deviation ΔY is outputted to the feed-back differential pressure calculation portion 172C.

The feed-back differential calculation portion 172c is a unit configured to calculate a feed-back differential pressure $DP_{FB}$, which is used for setting the acceptable differential pressure DP using a PID (Proportional Integral Derivative) control in such a manner that the actual yaw rate Y is caused to follow the target yaw rate YT. Specifically, the feed-back differential pressure $DP_{FB}$ is calculated by summing a P term (proportional gain×the current deviation ΔY), a I term (the last I term+integral gain×the current deviation ΔY) and a D term (derivative gain×(the last deviation ΔY–the current deviation ΔY). The calculated feed-back differential pressure $DP_{FB}$ is outputted to the acceptable differential pressure calculation portion 172D.

The acceptable differential pressure calculation portion 172D is a unit configured to calculate an acceptable differential pressure DP. Specifically, the acceptable differential pressure calculation portion 172D is configured to execute a first control for determining an acceptable differential pressure DP in accordance with a first method during a predetermined time period T1 after the split road deciding unit 140 decides that a road is a split road, and also a second control for determining an acceptable differential pressure DP in accordance with a second method after the predetermined time period T1 passes.

Figure 9:
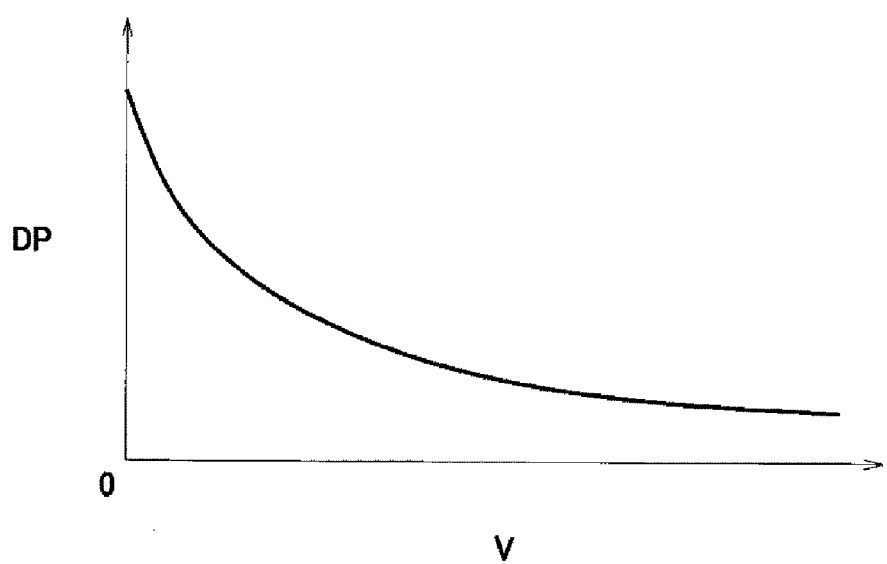
FIG. 9 is a map for setting a differential pressure, showing a relationship between a vehicle speed and a differential pressure.

In the first control, the acceptable differential pressure calculation portion 172D calculates an acceptable differential pressure DP based on the vehicle speed V and a preset map as shown in FIG. 9. FIG. 9 is a map for setting a differential pressure DP until the predetermined time period T1 passes after it is decided that a road is a split road, in which as the vehicle speed V is increased, the acceptable differential pressure DP is decreased.

In the second control, the acceptable differential pressure calculation portion 172D calculates an acceptable differential pressure DP based on the feed-forward differential pressure $DP_{FF}$ and the feed-back differential pressure $DP_{FB}$. Specifically, the acceptable differential pressure DP is calculated by summing the feed-forward differential pressure $DP_{FF}$ and the feed-back differential pressure $DP_{FB}$. If the acceptable differential pressure DP is calculated, the acceptable differential pressure calculation portion 172D outputs the calculated acceptable differential pressure DP to the upper limit setting unit 173.

The upper limit setting unit 173 has a function of determining an upper limit PU of a brake hydraulic pressure of a wheel brake on the high-μ road side (hereinafter, also referred to as a "high-μ side hydraulic pressure PH") by adding the acceptable differential pressure DP to a brake hydraulic pressure of a wheel brake on the low-μ road side (hereinafter, also referred to as a "low-μ side hydraulic pressure PL"). Also, if the control executing unit 174 as described below has started a third control, the upper limit setting unit 173 is configured to gradually increase the upper limit PU by adding a predetermined value to the last value of the upper limit PU. Namely, during the third control, the upper limit setting unit 173 sets the upper limit PU to have a value larger than a value obtained by adding the acceptable differential pressure DP to the low-μ side hydraulic pressure PL. If the upper limit PU is set, the upper limit setting unit 173 outputs the set upper limit PU to the control executing unit 174.

The control executing unit 174 is a unit configured to control a hydraulic pressure of the wheel brakes FL, RR, RL, FR based on the instruction for hydraulic pressure control determined by the anti-lock brake controlling unit 171 or the upper limit PU outputted from the upper limit setting unit 173. Specifically, if an ABS control is executed on a wheel brake on the low-μ road side, the control executing unit 174 controls the hydraulic pressure unit 10 based on the instruction for hydraulic pressure control determined by the anti-lock brake controlling unit 171 without referring to the upper limit PU.

Also, if a hydraulic pressure control is executed on a wheel brake on the high-μ road side, the control executing unit 174 controls the hydraulic pressure unit 10 so that a high-μ side hydraulic pressure PH, which is estimated based on a master cylinder pressure and histories of the inlet valve 13, the outlet valve 14 and the like, becomes equal to or lower than the upper limit PU, regardless of whether or not the ABS control is executed. In other words, the control executing unit 174 executes a limiting processing for limiting the high-μ side hydraulic pressure PH so that a differential pressure between the low-μ side hydraulic pressure PL and the high-μ side hydraulic pressure PH becomes equal to or smaller than the acceptable difference pressure DP.

More specifically, if the high-μ side hydraulic pressure PH has a value smaller than the upper limit PU, the control executing unit 174 does not set an instruction hydraulic pressure (target value) on the high-μ side hydraulic pressure PH, or sets the instruction hydraulic pressure based on the ABS control (when a wheel brake on the high-μ road side is being subjected to the ABS control). Also, if the high-μ side hydraulic pressure PH has a value equal to or higher than the upper limit PU, the control executing unit 174 sets the instruction hydraulic pressure (target value) on the high-μ side hydraulic pressure PH to a value equal to or lower than the upper limit PU. Further, in this case, the control executing unit 174 executes a pressure decreasing control or pressure-holding control on the hydraulic pressure unit 10.

Also, the control executing unit 174 has a function of deciding three decision conditions while the second control is being executed by the acceptable difference pressure calculation portion 172D and then executing a third control if any one of the three decision conditions is satisfied. Specifically, during the second control, as a condition for starting of the third control, the control executing unit 174 decides whether or not an ABS control has been started on a wheel brake on the high-μ road side (first decision condition), whether or not the acceptable difference pressure DP is equal to or larger than a first threshold TH1 (second decision condition), or whether or not the steering angle θ of the steering 7 is equal to or larger than a second threshold TH2 (third decision condition).

During the third control, the control executing unit 174 is configured to decide whether or not the vehicle state deciding unit 160 has decided that the vehicle 2 is in an unstable state and then to decrease an actual high-μ side hydraulic pressure PH by decreasing the upper limit PU to a value below the high-μ side hydraulic pressure PH, if it is decided that the vehicle state deciding unit 160 has decided that the vehicle 2 is in an unstable state. In particular, if the vehicle state deciding unit 160 has decided that the vehicle 2 is in an unstable state, the control executing unit 174 resets the upper limit PU based on a deviation ΔY between the actual yaw rate Y and the target yaw rate YT. Specifically, the control executing unit 174 resets the upper limit PU so that the larger the deviation ΔY between the actual yaw rate Y and the target yaw rate YT, the smaller the value thereof is. Also, during the unstable state, even if the deviation ΔY once increased is gradually decreased, the upper limit PU is maintained to a minimum value of values set until that time, without increasing the upper limit PU in accordance with the deviation ΔY. Meanwhile, a relationship of the deviation ΔY and the upper limit PU may be defined in advance by experiments, simulations and the like.

The memory unit 180 is a unit configured to properly store programs, constants, maps, calculation results and the like required for operation of the control unit 100.

Next, a method of controlling a high-μ side hydraulic pressure PH by the control unit 100 will he described. Meanwhile, the ABS control is a known control, and accordingly the illustration or description thereof will be omitted.

Figure 10:
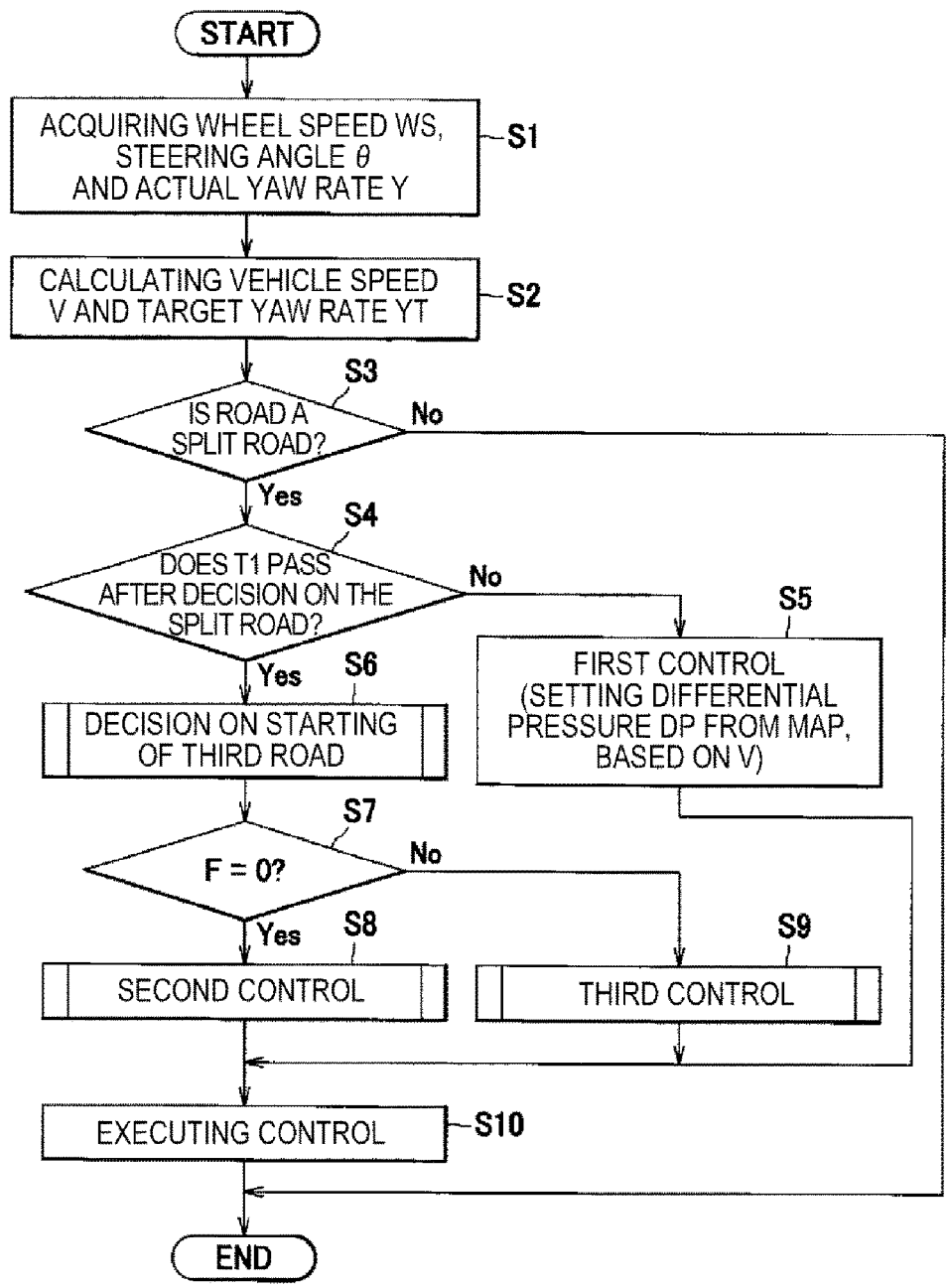
FIG. 10 is a flow chart showing control of a high μ-side hydraulic pressure.

As shown in FIG. 10, first, the control unit 100 acquires wheel speeds WS from the wheel speed sensors 91, acquires a steering angle θ from the steering angle sensor 93 and also acquires an actual yaw rate Y from the yaw rate sensor 94 (S1). After the step S1, the control unit 100 calculates a vehicle speed. V from the wheel speeds WS and also calculates a target yaw rate YT based on the vehicle speed V and the steering angle θ (S2).

After the step S2, the control unit 100 decides whether or not a road surface is a split road (S3). In the step S3, if it is decided that the road surface is not a split road (No), the control unit 100 ends the present control.

In the step S3, if it is decided that the road surface is a split road (Yes), the control unit 100 decides whether or not a predetermined time period T1 has passed after it is decided that the road surface is a split road (S4). In the step S4, if it is decided that the predetermined time period T1 has not passed (No), the control unit 100 sets an acceptable differential pressure DP by the first control (S5). Specifically, in the step S5, the control unit 100 calculates the acceptable differential pressure DP based on the vehicle speed V and the map as shown in FIG. 9.

In the step S4, if it is decided that the predetermined time period T1 has passed (Yes), the control unit 100 executes decision on starting of the third control for deciding whether or not a condition for starting of the third control has been satisfied (S6). In the step 6, the control unit 100 executes each of processing steps shown in a flow chart of FIG. 11.

Figure 11:
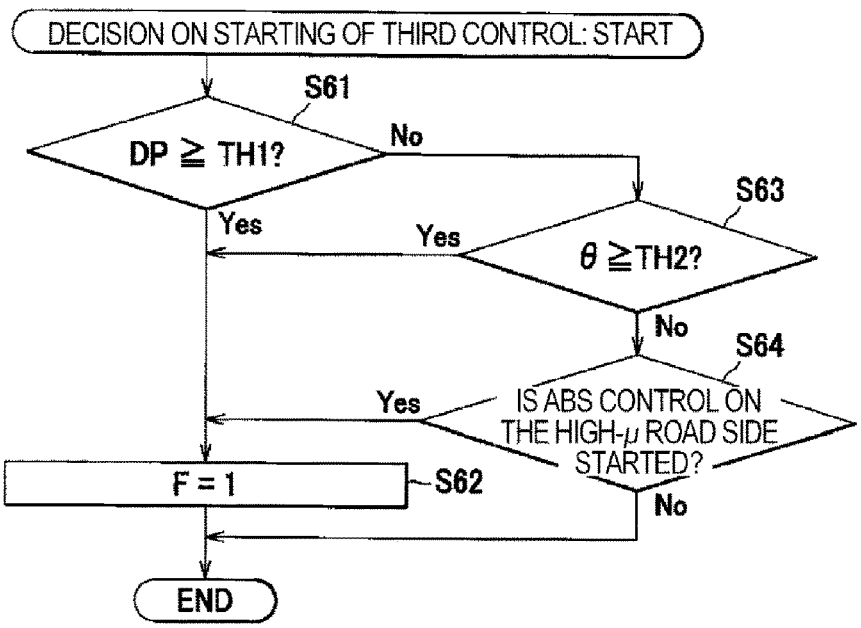
FIG. 11 is a flow chart showing decision on starting of a third control.

As shown in FIG. 11, during the decision on starting of the third control, first, the control unit 100 decides whether or not the acceptable differential pressure DP is equal to or larger than the first threshold TH1 (second decision condition as described above) (S61). In the step S6, if it is decided that DP≥TH1 (Yes), the control unit 100 set a flag F, which indicates that the condition for starting of the third control has been satisfied, to 1 (S62), and then ends the decision on starting of the third control.

In the step S61, if it is decided that DP<TH1 (No), the control unit 100 decides whether or not the steering angle θ is equal to or larger than the second threshold TH2 (third decision condition as described above) (S63). In the step S63, if it is decided that θ≥TH2 (Yes), the control unit 100 sets the flag F to 1 (S62) and then ends the decision on starting of the third control.

In the step S63, if it is decided that θ<TH2 (No), the control unit 100 decides whether or not the ABS control has been started on a wheel brake on the high-μ road side (first decision condition as described above) (S64). In the step S64, if it is decided that the ABS control has been started (Yes), the control unit 100 sets the flag F to 1 (S62) and then ends the decision on starting of the third control. In the step S64, if it is decided that the ABS control has not been started (No), the control unit 100 ends the decision on starting of the third control as it is.

Retuning to FIG. 10, after the step S6, the control unit 100 decides whether or not the flag F is 0, thereby deciding whether or not the condition for starting of the third control has been satisfied (S7). In the step S7, if it is decided that the flag F is 0 (Yes), the control unit 100 executes the second control (S8). In the step S8, the control unit 100 executes each of processing steps as shown in a flow chart of FIG. 12.

Figure 12:
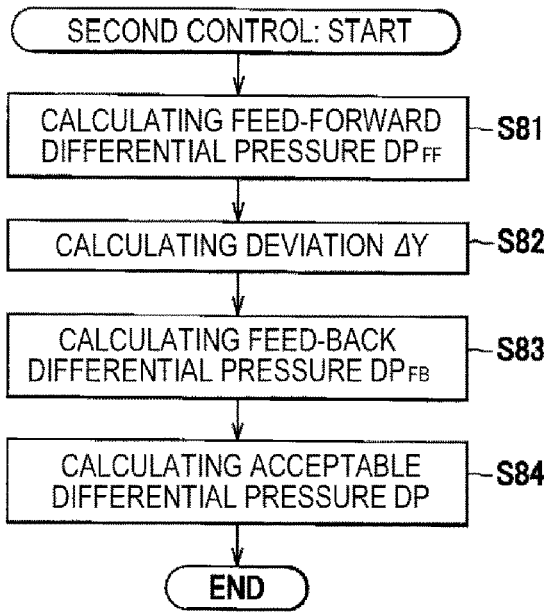
FIG. 12 is a flow chart showing a second control

As shown in FIG. 12, during the second control, first, the control unit 100 calculates a feed-forward differential pressure $DP_{FF}$ based on the vehicle speed V, the steering angle θ and the target yaw rate YT (S81). After step S81, the control unit 100 calculates a deviation ΔY between the actual yaw rate Y and the target yaw rate YT (S82) and then calculate a feed-back differential pressure $DP_{FB}$ by the PID control based on the deviation ΔY (S83). After step S83, the control unit 100 calculates the sum of the feed-forward differential pressure $DP_{FF}$ and the feed-back differential pressure $DP_{FB}$ as an acceptable differential pressure DP (S84), and then ends the second control.

Retuning to FIG. 10, if it is decided in the step S7 that the flag F is 1 (No), the control unit 100 executes the third control (S9). In the step S9, the control unit 100 executes each of processing steps as shown in a flow chart of FIG. 13.

Figure 13:
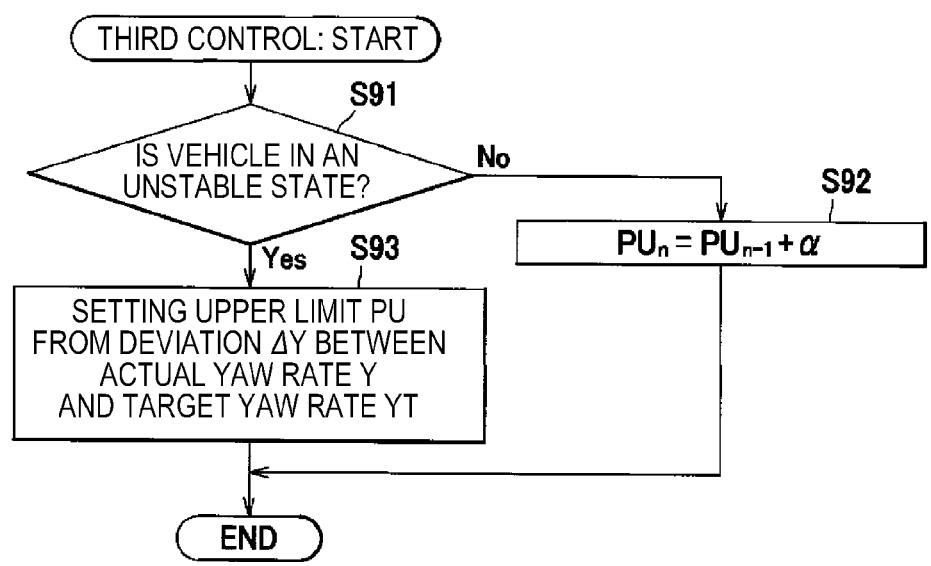
FIG. 13 is a flow chart showing a third control.

As shown in FIG. 13, during the third control, first, the control unit 100 decides whether or not the vehicle 2 is in an unstable state (S91). In the step S91, if it is decided that the vehicle 2 is not in an unstable state (No), the control unit 100 determines a current value $PU_n$ of an upper limit PU of a high-μ side hydraulic pressure PH by adding a predetermined value α to the last value $PU_{n-1}$ of the upper limit PU (S92) and then ends the third control.

In the step S91, if it is decided that the vehicle is in an unstable state (Yes), the control unit 100 sets an upper limit PU of a high-μ side hydraulic pressure PH based on the deviation ΔY between the actual yaw rate Y and the target yaw rate YT (S93) and then ends the third control.

Returning to FIG. 10, the control unit 100 proceeds to processing of a step S10 after the steps S5, S8 and S9. In the case of proceeding from the step 5 or 8 to the step 10, the control unit 100 sets the upper limit PU by adding the acceptable differential pressure DP, which is set in the step S5 or S8, to a low-μ side hydraulic pressure PL and then controls the high-μ side hydraulic pressure PH so that the high-μ side hydraulic pressure PH becomes equal to or lower than the upper limit PU. Also, in the case of proceeding from the step S9 to the step 10, the control unit 100 controls the high-μ side hydraulic pressure PH so that the high-μ side hydraulic pressure PH becomes equal to or lower than the upper limit PU, which is set in the step S9.

Figure 14A:
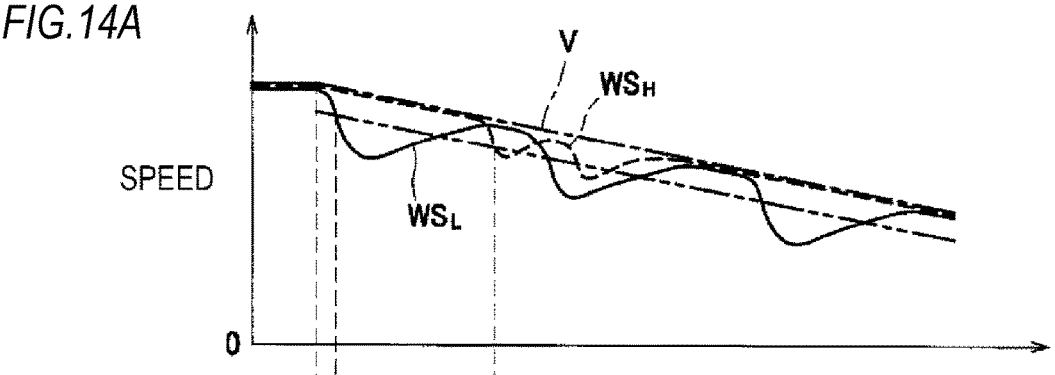
FIGS. 14A to 14D are a time charts showing an example of operation of the control unit.

Next, one example of operation of the control unit 100 will be described with reference to FIG. 14. As shown in FIGS. 14A and B, when a driver brakes a vehicle 2 while the vehicle 2 travels on a split road (time t1), a low-μ side hydraulic pressure PL and a high-μ side hydraulic pressure PH are increased together with a master cylinder presser PM. At this time, a wheel 3 on the low-μ road side starts to slip, and thus a wheel speed $WS_L$ of the wheel 3 on the low-μ road side is gradually separated from the vehicle speed V.

If an amount of slip of the wheel 3 on the low-μ road side is equal to or larger than a predetermined threshold (time t2), an ABS control is started on the wheel 3 on the low-μ road side, and at the same time, decision on whether or not the road is a split road is performed and thus it is decided that the road is a split road. Until the predetermined time period T1 passes after it is decided that the road is a split road, the control unit 100 determines an acceptable differential pressure DP by the first control and then controls the high-μ side hydraulic pressure PH based on an upper limit PU obtained from the acceptable differential pressure DP (time t2 to t3).

If the predetermined time period T1 passes after it is decided that the road is a split road (time t3), the control unit 100 determines an acceptable differential pressure DP by the second control and then controls the high-μ side hydraulic pressure PH based on an upper limit PU obtained from the acceptable differential pressure DP (time t3 to t4). Then, if the acceptable differential pressure DP becomes equal to or larger than the first thresh hold TH1 during the second control (time t4), the control unit 100 starts the third control and decides whether or not the vehicle 2 becomes an unstable state, based on an actual yaw rate Y and a target yaw rate YT.

Figure 14B:
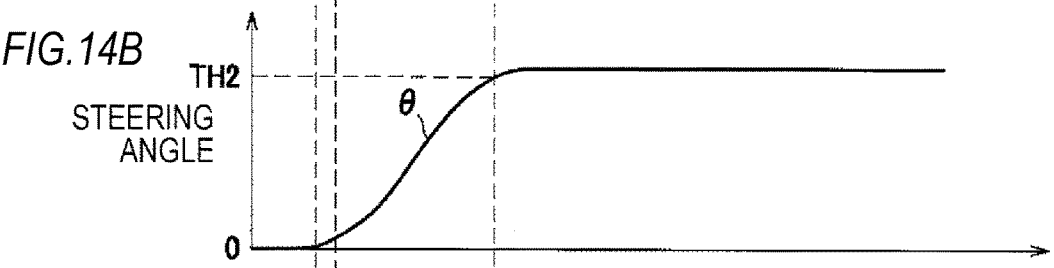
Figure 14C:
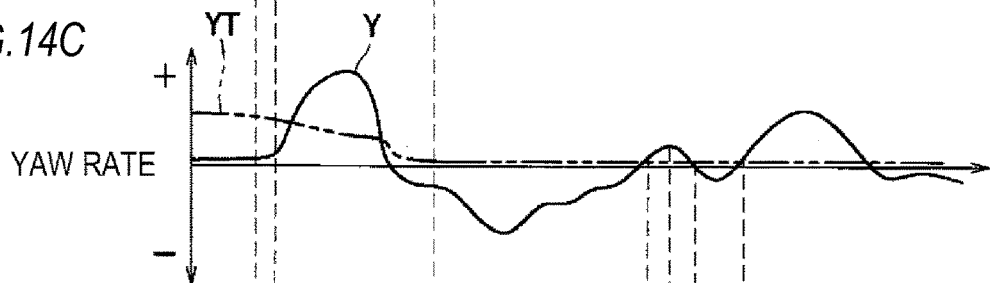
Figure 14D:
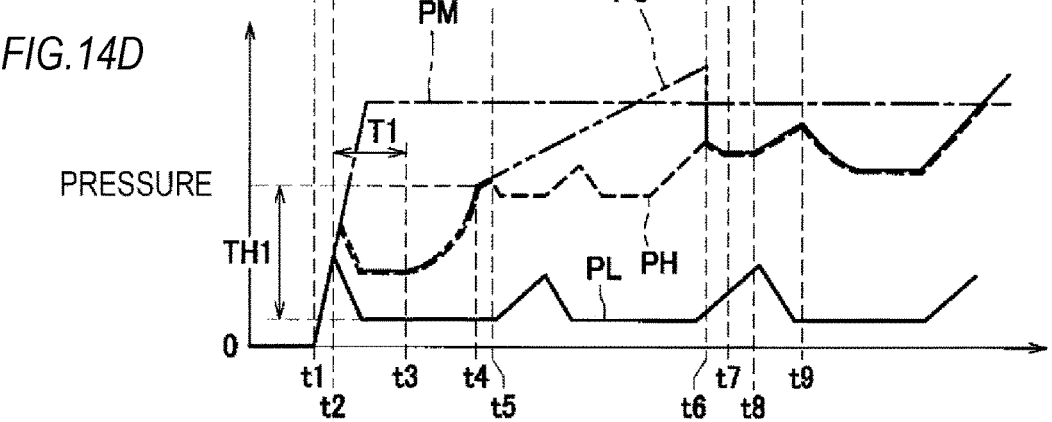

However, on the split road, the vehicle 2 tends to turn to the high-μ road side. Accordingly, the driver attempts to rotate the steering 7 by a certain amount in the opposite direction (direction which causes the vehicle 2 to turn to the low-μ road side). As a result, as shown in FIG. 14B, the steering angle θ is gradually increased and then is generally maintained at a constant angle. Due to such operation of the steering 7, the actual yaw rate Y exhibits a waveform as shown in FIG. 14C.

During the third control, if the actual yaw rate Y is smaller than the target yaw rate YT, the control unit 100 gradually increases the upper limit PU by adding a predetermined value α to the last value $PU_{n-1}$ of the upper limit PU (time t4 to t6). Meanwhile, during the period from t4 to t6, if each of pressure-decreasing, pressure-holding and pressure-increasing conditions for an ABS control on a wheel 3 on the high-μ road side is fulfilled, the respective controls are executed on the wheel 3 on the high-μ road side. Specifically, if a condition for starting of the ABS control on the wheel 3 on the high-μ road side is fulfilled at time t5, the control unit 100 executes a pressure-decreasing control on the wheel 3 on the high-μ road side and then at a timing when each of the condition is fulfilled, the respective controls are executed in order from pressure-holding control, pressure-increasing control, pressure-decreasing control and so on. In the present embodiment, during a period from t5 to t6, the ABS control on the wheel 3 on the high-μ road side is executed.

At time t6, if the actual yaw rate Y become larger than the target yaw rate YT, the control unit 100 decides that the vehicle 2 is in an unstable state and sets the upper limit PU based on a deviation ΔY between the actual yaw rate Y and the target yaw rate YT. Herein, the upper limit PU to be set based on the deviation ΔY is set to a value, which is smaller than a high-μ side hydraulic pressure PH during the third control, by experiments, simulations and the like. Therefore, the control unit 100 decides that the high-μ side hydraulic pressure PH exceeds the upper limit PU and then executes the pressure-decreasing control on the wheel 3 on the high-μ road side, thereby decreasing the high-μ side hydraulic pressure PH.

Then, during a period from t6 to t7, the deviation ΔY between the actual yaw rate Y and the target yaw rate YT is gradually increased, and as a result, the upper limit PU is gradually decreased. Therefore, the high-μ side hydraulic pressure PH is also gradually decreased following the upper limit PU. In addition, during a period from t7 to t8, the deviation ΔY between the actual yaw rate Y and the target yaw rate YT is gradually decreased, but the upper limit PU is maintained to a minimum value of values set until that time (i.e., a (value at time t7). Therefore, the high-μ side hydraulic pressure PH is maintained by the pressure-holding control.

If the actual yaw rate Y becomes equal to or smaller than the target yaw rate YT (time t8), the control unit 100 decides that the vehicle 2 is not in an unstable state and then gradually increases the upper limit PU by adding a predetermined value α to the last value $PU_{n-1}$ of the upper limit PU (time t8 to t9). During this period, the high-μ side hydraulic pressure PH is increased by the pressure-increasing control.

At time t9, if the actual yaw rate Y becomes larger than the target yaw rate YT again, the control unit 100 sets the upper limit PU based on the deviation ΔY between the actual yaw rate Y and the target yaw rate YT in the same manner as the control as described above. Therefore, the high-μ side hydraulic pressure PH is decreased again.

According to the foregoing, the following effects can be achieved in the present embodiment.

During the third control, if the vehicle 2 is in an unstable state, the high-μ side hydraulic pressure PH is decreased. Accordingly, it is possible to further enhance the vehicle attitude control.

Whether or not the vehicle 2 is in an unstable state is decided by deciding whether or not the vehicle 2 has been swayed to the high-μ road side by comparison between the actual yaw rate Y and the target yaw rate YT. Accordingly, in the case where the vehicle 2 has been swayed to the high-μ road side, the high-μ side hydraulic pressure PH can be decreased, thereby allowing braking to be more stably performed.

By using the deviation ΔY between the actual yaw rate Y and the target yaw rate YT, it is possible to set the upper limit PU in accordance with an extent of swaying of the vehicle 2. Accordingly, the high-μ side hydraulic pressure PH can be appropriately decreased.

During the third control, if the vehicle 2 is not in an unstable state, the upper limit PU is gradually increased by adding a predetermined value α to the last value $PU_{n-1}$ of the upper limit PU. Accordingly, it is possible to suppress a sudden fluctuation of the high-μ side hydraulic pressure PH, thereby allowing braking to be more stably performed Meanwhile, the present disclosure is not limited to the foregoing embodiments, but can be used in various forms as illustrated below.

Although in the foregoing embodiments, decisions are performed on three conditions (first to third conditions as described above) as conditions for starting of the third control, the present disclosure is not limited thereto. Starting of the third control may be decided based on only one of the three conditions and the other two conditions may be excluded from the basis of decision. Also, two or four conditions may be employed as the basis of decision and if at least one of the two or four conditions is satisfied, the third control may be started.

The invention claimed is:

1. A vehicle brake hydraulic pressure control device comprising:
   a split road deciding unit configured to decide whether or not a road in contact of wheels of a vehicle is a split road;
   a hydraulic pressure controlling unit capable of executing a limiting processing for limiting a hydraulic pressure of a wheel brake on a high-μ road side so that a differential pressure between a hydraulic pressure of a wheel brake on a low-μ road side and the hydraulic pressure of the wheel brake on the high-μ road side becomes equal to or smaller than an acceptable differential pressure, under condition that the split road deciding unit decides that the road is the split road; and
   a vehicle state deciding unit configured to decide whether or not the vehicle is in an unstable state,
   wherein the hydraulic pressure controlling unit is capable of executing:
   a first control for determining the acceptable differential pressure in accordance with a first method during a predetermined time period after the split road deciding unit decides that the road is the split road;
   a second control for determining the acceptable differential pressure in accordance with a second method after the predetermined time period passes; and
   a third control configured to be started under condition that during the second control, an anti-lock brake control on the wheel brake on the high-pt road side is started, the acceptable differential pressure is equal to or larger than a first threshold, or a steering angle of a steering is equal to or larger than a second threshold, and
   wherein during the third control, the hydraulic pressure controlling unit is configured to decrease the hydraulic pressure of the wheel brake on the high-μ road side if the vehicle state deciding unit decides that the vehicle is in an unstable state, and
   wherein the hydraulic pressure controlling unit is configured to set an upper limit of the hydraulic pressure of the wheel brake on the high-μ road side so that the upper limit has a value larger than a value obtained by adding the acceptable differential pressure to the hydraulic pressure of the wheel brake on the low-μ road side.

2. The vehicle brake hydraulic pressure control device according to claim 1 further comprising a yaw rate detecting unit configured to detect an actual yaw rate,
   wherein the vehicle state deciding unit is configured to decide whether or not the vehicle has been swayed to the high-μ road side by comparison between the actual yaw rate detected by the yaw rate detection unit and a target yaw rate and then to decide that the vehicle is in an unstable state if it is decided that the vehicle has been swayed to the high-μ road side.

3. A vehicle brake hydraulic pressure control device comprising:
   a split road deciding unit configured to decide whether or not a road in contact of wheels of a vehicle is a split road;
   a hydraulic pressure controlling unit capable of executing a limiting processing for limiting a hydraulic pressure of a wheel brake on a high-μ road side so that a differential pressure between a hydraulic pressure of a wheel brake on a low-μ road side and the hydraulic pressure of the wheel brake on the high-μ road side becomes equal to or smaller than an acceptable differential pressure, under condition that the split road deciding unit decides that the road is the split road; and
   a vehicle state deciding unit configured to decide whether or not the vehicle is in an unstable state,
   wherein the hydraulic pressure controlling unit is capable of executing:
   a first control for determining the acceptable differential pressure in accordance with a first method during a predetermined time period after the split road deciding unit decides that the road is the split road;
   a second control for determining the acceptable differential pressure in accordance with a second method after the predetermined time period passes; and
   a third control configured to be started under condition that during the second control, an anti-lock brake control on the wheel brake on the high-μ road side is started, the acceptable differential pressure is equal to or larger than a first threshold, or a steering angle of a steering is equal to or larger than a second threshold, and
   wherein during the third control, the hydraulic pressure controlling unit is configured to decrease the hydraulic pressure of the wheel brake on the high-μ road side if the vehicle state deciding unit decides that the vehicle is in an unstable state, and wherein the hydraulic pressure controlling unit is configured to set an upper limit of the hydraulic pressure of the wheel brake on the high-μ road side so that the upper limit has a value larger than a value obtained by adding the acceptable differential pressure to the hydraulic pressure of the wheel brake on the low-μ road side, if during the third control, the vehicle state deciding unit decides that the vehicle is not in an unstable state, and also to determine the upper limit based on a deviation between the actual yaw rate and the target yaw rate, if during the third control, the vehicle state deciding unit decides that the vehicle is in an unstable state.

4. The vehicle brake hydraulic pressure control device according to claim 2, wherein the hydraulic pressure controlling unit is configured to set an upper limit of the hydraulic pressure of the wheel brake on the high-μ road side so that the upper limit has a value larger than a value obtained by adding the acceptable differential pressure to the hydraulic pressure of the wheel brake on the low-μ road side, if during the third control, the vehicle state deciding unit decides that the vehicle is not in an unstable state, and also to determine the upper limit based on a deviation between the actual yaw rate and the target yaw rate, if during the third control, the vehicle state deciding unit decides that the vehicle is in an unstable state.

5. The vehicle brake hydraulic pressure control device according to claim 3, wherein the hydraulic pressure controlling unit is configured to gradually increase the upper limit by adding a predetermined value to a last value of the upper limit, if during the third control, the vehicle state deciding unit decides that the vehicle is not in an unstable state.

6. The vehicle brake hydraulic pressure control device according to claim 4, wherein the hydraulic pressure controlling unit is configured to gradually increase the upper limit by adding a predetermined value to a last value of the upper limit, if during the third control, the vehicle state deciding unit decides that the vehicle is not in an unstable state.

* * * * *